United States Patent
Honma et al.

(10) Patent No.: US 10,570,298 B2
(45) Date of Patent: Feb. 25, 2020

(54) PHOTOCURABLE INK, INK CONTAINER, AND IMAGE FORMING METHOD

(71) Applicant: CANON KABUSHIKI KAISHA, Tokyo (JP)

(72) Inventors: Takeshi Honma, Tokyo (JP); Motokazu Kobayashi, Yokohama (JP); Yoshinori Kotani, Yokohama (JP); Shiori Yonezawa, Tokyo (JP); Kaori Kawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 176 days.

(21) Appl. No.: 15/799,669

(22) Filed: Oct. 31, 2017

(65) Prior Publication Data

US 2018/0127608 A1   May 10, 2018

(30) Foreign Application Priority Data

Nov. 7, 2016 (JP) ................................ 2016-217079
Sep. 27, 2017 (JP) ................................ 2017-186693

(51) Int. Cl.

| C09D 11/101 | (2014.01) |
|---|---|
| C09D 11/322 | (2014.01) |
| C08K 3/22 | (2006.01) |
| B05D 1/26 | (2006.01) |
| B05D 3/06 | (2006.01) |
| C09D 11/107 | (2014.01) |
| C08K 3/02 | (2006.01) |
| C08F 20/18 | (2006.01) |
| C08F 2/46 | (2006.01) |
| C08K 3/08 | (2006.01) |

(52) U.S. Cl.
CPC ............ *C09D 11/107* (2013.01); *C08F 20/18* (2013.01); *C08K 3/02* (2013.01); *C08F 2/46* (2013.01); *C08K 2003/0806* (2013.01); *C08K 2003/0812* (2013.01)

(58) Field of Classification Search
CPC .......................... C09D 11/101; C09D 11/037
See application file for complete search history.

(56) References Cited

FOREIGN PATENT DOCUMENTS

| JP | 2001181541 A | * | 7/2001 |
|---|---|---|---|
| JP | 2005298757 A | | 10/2005 |

OTHER PUBLICATIONS

Computer-generated English-language translation of JP 2001-181541 A.*

* cited by examiner

*Primary Examiner* — Vu A Nguyen
(74) *Attorney, Agent, or Firm* — Canon U.S.A., Inc. IP Division

(57) ABSTRACT

A photocurable ink containing a first liquid containing a polymerizable compound and a photopolymerization initiator, and a second liquid that is incompatible with the first liquid, in which droplets formed by the second liquid are dispersed in the first liquid, wherein the photocurable ink contains first particles and second particles having higher hydrophilicity than that of the first particles, wherein the first particles are adsorbed on an interface between the first liquid and the second liquid, and the second particles are present in the second liquid.

19 Claims, 4 Drawing Sheets

PHOTOCURABLE INK, INK CONTAINER, AND IMAGE FORMING METHOD

BACKGROUND

Field of the Disclosure

The present disclosure relates to a photocurable ink, an ink container, and an image forming method.

Description of the Related Art

In recent years, in the market of commercial printing, method for forming images on recording media (substrates) other than white recording media such as transparent or translucent films, or colored paper sheets are strongly demanded. In forming an image on these recording media other than white recording media, a white image is sometimes formed.

Japanese Patent Laid-Open No. 2005-298757 suggests a photocurable ink containing a polymerizable compound and a low-boiling point solvent as an ink for forming a white image. In Japanese Patent Laid-Open No. 2005-298757, since the low-boiling point solvent is volatilized during the curing of the photocurable ink, a cured film obtained by curing the photocurable ink becomes a porous film in which many voids are present in the film. By scattering light by these many voids, the cured film represents a white color.

SUMMARY

A photocurable ink containing a first liquid containing a polymerizable compound and a photopolymerization initiator, and a second liquid that is incompatible with the first liquid, in which droplets formed by the second liquid are dispersed in the first liquid, wherein the photocurable ink contains first particles and second particles having higher hydrophilicity than that of the first particles, wherein the first particles are adsorbed on an interface between the first liquid and the second liquid, and the second particles are present in the second liquid.

Further features of the present disclosure will become apparent from the following description of exemplary embodiments (with reference to the attached drawings).

DESCRIPTION OF EMBODIMENTS

Figure 1A:
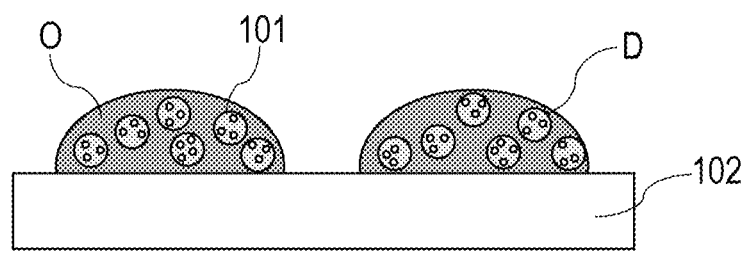
FIGS. 1A to 1D show a drawing schematically showing an image forming method using the photocurable ink according to this exemplary embodiment.

However, in Japanese Patent Laid-Open No. 2005-298757, the low-boiling point solvent is present by having compatibility with the polymerizable compound in the ink. Therefore, the voids in the formed cure film tend to be very minute. As a result, the cured film formed by using the ink described in Japanese Patent Laid-Open No. 2005-298757 had an insufficient degree of whiteness.

Furthermore, Japanese Patent Laid-Open No. 2005-298757 also describes an ink using water as a low-boiling point solvent. However, the ink containing water described in Japanese Patent Laid-Open No. 2005-298757 is separated into two layers: an aqueous layer and an oil layer when a time has passed after mixing, and thus has low storage stability.

Therefore, in view of the above-mentioned problem, the present disclosure aims at providing a photocurable ink that can form a white image having higher storage stability and a higher degree of whiteness than those of conventional white images.

The embodiments of the present disclosure will be explained in detail. The present disclosure is not limited to the following embodiments, and embodiments obtained by adding modification, improvement or the like has been appropriately to the following embodiments based on the general knowledge of person skilled in the arts within a scope that does not deviate from the purport of the present disclosure are also included in the scope of the present disclosure.

The photocurable ink 10 according to this exemplary embodiment (hereinafter referred to as "ink 10") contains a first liquid (O) containing a polymerizable compound (A) and a photopolymerization initiator (B), and a second liquid (W) that is incompatible with the first liquid (O). In the ink 10, the second liquid (W) forms droplets, and the droplets formed by the second liquid (W) are dispersed in the first liquid (O). Furthermore, the ink 10 contains inorganic particles (Eb), which are the first particles, and particles (D), which are second particles. The first particles (Eb) are adsorbed on an interface between the first liquid (O) and the second liquid (W), and the particles (D) are present in the second liquid (W). That is, the second liquid (W) contains the particles (D).

The "ink" in the present disclosure refers to a composition having fluidity such as a liquid form or a gel form, which is used for forming a film by disposing the ink on a substrate, or coloring the surface or inside of the substrate. That is, the "ink" in the present disclosure includes inks being free from dyes or pigments, and also includes colorless inks in the state of an ink before being applied onto a substrate.

The ink 10 is specifically preferably used in the case when a white image is formed by applying the ink 10 onto a substrate by ink-jet application and curing the ink 10 by irradiation with light. That is, the ink 10 is preferable as an ink-jet photocurable ink. When the ink 10 is cured to form an ink film 106 (hereinafter sometimes simply referred to as "film 106"), a film having many voids in the film 106 can be formed. Furthermore, flocculated forms of particles (D) are formed in those voids. It is presumed that the reason why many voids are formed in the film 106 is that the parts in which the volatile component was present turn into voids by the vaporization of the volatile component such as the water (C) contained in the ink 10 during and/or after the curing of the ink 10. Furthermore, it is presumed that the reason why the flocculated forms of the particles (D) are formed in the voids is that the volatile component is vaporized as mentioned above, and the particles (D) are flocculated. In the film 106, light is scatted by the void, and light is scattered also by the flocculated forms of the particles (D) that are present in the voids. Therefore, according to the ink 10, a film having a higher degree of whiteness than that of a film in which only voids are present can be formed, and thus a white image having a higher degree of whiteness than that of conventional white images can be obtained.

The respective components of the ink 10 will be explained in detail.

<First Liquid (O)>

The first liquid (O) contained in the ink 10 is a liquid having hydrophobicity. The first liquid (O) is preferably an oil-based liquid. Furthermore, the first liquid (O) is preferably a photocurable liquid that is cured when irradiated with active energy ray such as ultraviolet light.

The first liquid (O) contains a polymerizable compound (A) and a photopolymerization initiator (B). The polymerizable compound (A) is not specifically limited as long as it is a compound having a polymerizable functional group, and monomers, oligomers, polymers and mixtures thereof and the like can be used. In the case when a solid polymerizable compound is used, it is preferable that the solid polymerizable compound is used by mixing with a liquid polymerizable compound to thereby dissolve the solid polymerizable compound in the liquid polymerizable compound.

Furthermore, the first liquid (O) is a liquid that is incompatible with the second liquid (W), which will be mentioned below. Since the first liquid (O) and the second liquid (W) are incompatible, an interface is formed between the first liquid (O) and the second liquid (W). By this way, the second liquid (W) can form droplets 101. By controlling the size, dispersion state and the like of these droplets 101, the size of the voids 105 that are present in the film 106 after the ink 10 according to this exemplary embodiment has been cured can be controlled, and thus the degree of whiteness of the film 106 can be enhanced.

[Polymerizable Compound (A)]

The polymerizable compound (A) contained in the first liquid (O) in the ink 10 is a compound that reacts with a polymerization factor (radical or the like) generated from the photopolymerization initiator (B), which will be mentioned below, to form a film formed from a polymer compound (polymer) by a chain reaction (polymerization reaction).

The polymerizable compound (A) may be constituted by one kind of polymerizable compound, or may be constituted by plural kinds of polymerizable compounds.

Examples of such polymerizable compound (A) include a radical polymerizable compound. The radical polymerizable compound is preferably a compound having one or more acryloyl group(s) or methacryloyl group(s), i.e., a (meth) acrylic compound.

Examples of monofunctional (meth)acrylic compounds having one acryloyl group or methacryloyl group include, but are not limited to, phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, EO-modified p-cumylphenol (meth)acrylate, 2-bromophenoxyethyl (meth)acrylate, 2,4-dibromophenoxyethyl (meth)acrylate, 2,4,6-tribromophenoxyethyl (meth)acrylate, EO-modified phenoxy (meth)acrylate, PO-modified phenoxy (meth)acrylate, polyoxyethylenenonylphenyl ether (meth)acrylate, isobornyl (meth)acrylate, 1-adamantyl (meth)acrylate, 2-methyl-2-adamantyl (meth) acrylate, 2-ethyl-2-adamantyl (meth)acrylate, bornyl (meth) acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth) acrylate, benzyl (meth)acrylate, 1-naphthylmethyl (meth) acrylate, 2-naphthylmethyl (meth)acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth) acrylate, methoxyethylene glycol (meth)acrylate, ethoxyethyl (meth)acrylate, methoxypolyethylene glycol (meth) acrylate, methoxypolypropylene glycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth) acrylate, N,N-diethyl (meth)acrylamide, N,N-dimethylaminopropyl (meth)acrylamide and the like.

Examples of commercially available products of the above-mentioned monofunctional (meth)acrylic compound include, but are not limited to, Aronix M101, M102, M110, M111, M113, M117, M5700, TO-1317, M120, M150 and M156 (these are manufactured by Toagosei Co., Ltd., "Aronix" is a registered trademark), MEDOL10, MIBDOL10, CHDOL10, MMDOL30, MEDOL30, MIBDOL30, CHDOL30, LA, IBXA, 2-MTA, HPA, Biscoat #150, #155, #158, #190, #192, #193, #220, #2000, #2100 and #2150 (these are manufactured by Osaka Organic Chemical Industry Ltd.), Light Acrylate BO-A, EC-A, DMP-A, THF-A, HOP-A, HOA-MPE, HOA-MPL, PO-A, P-200A, NP-4EA, NP-8EA and Epoxy Ester M-600A (these are manufactured by Kyoeisha Chemical Co., Ltd.), KAYARAD TC110S, R-564 and R-128H (these are manufactured by Nippon Kayaku Co., Ltd.), NK ester AMP-10G and AMP-20G (these are manufactured by Shin-Nakamura Chemical Co., Ltd.), FA-511A, 512A and 513A (these are manufactured by Hitachi Chemical Ltd.), PHE, CEA, PHE-2, PHE-4, BR-31, BR-31M and BR-32 (these are manufactured by DKS Co., Ltd.), VP (manufactured by BASF), ACMO, DMAA and DMAPAA (these are manufactured by Kohjin), and the like.

Examples of the multifunctional (meth)acrylic compound having two or more acryloyl groups or methacryloyl groups include, but are not limited to, trimethylolpropane di(meth) acrylate, trimethylolpropane tri(meth)acrylate, EO-modified trimethylolpropane tri(meth)acrylate, PO-modified trimethylolpropane tri(meth)acrylate, EO, PO-modified trimethylolpropane tri(meth)acrylate, dimethyloltricyclodecane diacrylate, pentaerythritol tri(meth)acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth) acrylate, neopentyl glycol di(meth)acrylate, 1,3-adamantanedimethanol diacrylate, o-xylylenedi(meth)acrylate, m-xylylenedi(meth)acrylate, p-xylylenedi(meth)acrylate, 1,9-nonanediol diacrylate, 1,10-decanediol diacrylate, tris (2-hydroxyethyl)isocyanulate tri(meth)acrylate, tris (acryloyloxy) isocyanulate, bis(hydroxymethyl)tricyclodecanedi (meth)acrylate, dipentaerythritol penta(meth)acrylate, dipentaerythritol hexa(meth)acrylate, EO-modified 2,2-bis (4-((meth)acryloxy)phenyl)propane, PO-modified 2,2-bis(4-((meth)acryloxy)phenyl)propane, EO, PO-modified 2,2-bis (4-((meth)acryloxy)phenyl)propane and the like.

Examples of commercially available products of the above-mentioned multifunctional (meth)acrylic compound include, but are not limited to, Yupimer UV SA1002 and SA2007 (these are manufactured by Mitsubishi Chemical Corporation, "Yupimer" is a registered trademark), Biscoat #195, #230, #215, #260, #335HP, #295, #300, #360, #700, GPT and 3PA (these are manufactured by Osaka Organic Chemical Industry Ltd.), Light Acrylate 4EG-A, 9EG-A, NP-A, DCP-A, BP-4EA, BP-4PA, TMP-A, PE-3A, PE-4A and DPE-6A (these are manufactured by Kyoeisha Chemical Co., Ltd.), A-DCP, A-HD-N, A-NOD-N and A-DOD-N (these are manufactured by Shin-Nakamura Chemical Co., Ltd.), KAYARAD PET-30, TMPTA, R-604, DPHA, DPCA-20, -30, -60, -120, HX-620, D-310 and D-330 (these are manufactured by Nippon Kayaku Co., Ltd.), Aronix M208, M210, M215, M220, M240, M305, M309, M310, M315, M325 and M400 (these are manufactured by Toagosei Co., Ltd.), Ripoxy VR-77, VR-60 and VR-90 (these are manufactured by Showa Denko K. K., "Ripoxy" is a registered trademark), and the like.

In the above-mentioned compound group, the (meth)acrylate refers to an acrylate or a methacrylate having an equivalent alcohol residue to that of the acrylate. A (meth)acryloyl group means an acryloyl group or a methacryloyl group having an equivalent alcohol residue to that of the acryloyl group. EO represents ethylene oxide, and EO-modified compound A represents a compound in which the (meth)acrylic acid residue of compound A and an alcohol residue are bonded through the block structure of an ethylene oxide group. Furthermore, PO represents propylene oxide, and PO-modified compound B represents a compound in which the (meth)acrylic acid residue of compound B and an alcohol residue are bonded through the block structure of a propylene oxide group.

Furthermore, the (meth)acrylic compound, which is the polymerizable compound (A), is preferably a compound having a low solubility in water with respect to the (meth)acrylic compound. Specifically, it is preferable that the solubility of water at 25° C. is 0.01% by mass or more and 2.0% by mass or less when the total mass of the (meth)acrylic compound is 100% by mass. Similarly, in the case when the polymerizable compound (A) is constituted by plural kinds of (meth)acrylic compounds, it is preferable that the mixture of the (meth)acrylic compounds, which is the polymerizable compound (A), is a mixture having low water solubility. Specifically, it is preferable that the solubility of water at 25° C. is 0.01% by mass or more and 2.0% by mass or less when the total mass of the mixture of the (meth)acrylic compounds is 100% by mass.

By using the (meth)acrylic compound having low water solubility as the polymerizable compound (A), the amount of the water (C) contained in droplets 101 formed by the second liquid (W) dissolved in the polymerizable compound (A) contained in the first liquid (O) can be decreased. By this way, the transfer of the water (C) contained in the second liquid (W) in the ink 10 via the (meth)acrylic compound, which is the polymerizable compound (A), can be suppressed. As a result, the droplets 101 can be kept at a desired size. That is, the stability of the droplets 101 formed by the second liquid (W) in the ink 10 can be improved. By improving the stability of the droplets 101 in the ink 10, a white image having a high degree of whiteness can be formed even the ink 10 after being stored for a long period is used. Specifically, by adjusting the above-mentioned solubility of the water to be 2.0% by mass or less, the droplets 101 can be kept at a desired size for a long period. Furthermore, if the size of the droplets 101 increases, various physical property values are changed due to decrease in the viscosity of the ink 10, and the like. However, by improving the stability of the droplets 101 as mentioned above, the change in physical properties such as the viscosity of the ink can be suppressed for a long period. In addition, even in the case when additional components other than the water (C) as mentioned below are contained in the second liquid (W), the solubility of water at 25° C. with respect to the (meth)acrylic compound, which is the polymerizable compound (A), changes little. Therefore, even in such case, the stability of the size of the droplets 101 can be improved by adjusting the solubility of water to be as mentioned above.

The solubility of water at 25° C. with respect to the (meth)acrylic compound, which is the polymerizable compound (A), can be measured by the following procedure by using a measurement apparatus such as a Karl-Fischer moisture measurement apparatus. Firstly, a (meth)acrylic compound (in the case when plural kinds of (meth)acrylic compounds are contained, a mixture thereof) and water are put into a sample tube at a ratio of 8:2 (mass ratio) and shaken, and the sample tube is allowed to stand still until the (meth)acrylic compound and water are layer-separated. Thereafter the separated (meth)acrylic compound is separated, and the amount of the moisture contained in the (meth)acrylic compound is measured by using a Karl-Fischer moisture meter (MKC-510, manufactured by Kyoto Electronic Manufacturing Co., Ltd.). All of the above-mentioned experiments are conducted under an environment at 25° C.

The incorporation rate of the polymerizable compound (A) in the first liquid (O) is preferably 70% by mass or more and 99.99% by mass or less when the total mass of the first liquid (O) is 100% by mass. Furthermore, the incorporation rate is more preferably 80% by mass or more and 99.9% by mass or less, preferably 90% by mass or more and 99% by mass or less.

By setting the incorporation rate of the polymerizable compound (A) in the first liquid (O) to 70% by mass or more with respect to the total mass of the first liquid (O), the mechanical strength of the formed film 106 can be increased. Furthermore, by setting the incorporation rate to be 99.99% by mass or less with respect to the total mass of the first liquid (O), the curing rate of the ink 10 becomes fast, and the reaction efficiency can be enhanced.

[Photopolymerization Initiator (B)]

The photopolymerization initiator (B) contained in the first liquid (O) in the ink 10 is a compound that generates a polymerization factor (radical or the like) when it senses light at a predetermined wavelength. Specifically, the photopolymerization initiator (B) is a polymerization initiator that generates a polymerization factor by light (infrared ray, visible ray, ultraviolet ray, far ultraviolet ray, X-ray, charged particle ray such as electron beam, radiation and the like). More specifically, for example, a polymerization initiator that generates a polymerization factor by light at a wavelength of 150 nm or more and 400 nm or less is preferable.

The photopolymerization initiator (B) may be constituted by one kind of photopolymerization initiator, or may be constituted by plural kinds of photopolymerization initiators.

Examples of such photopolymerization initiator (B) include radical generators.

Examples of the radical generators include, but are not limited to, 2,4,5-triarylimidazole dimers optionally having substituents such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer and 2-(o- or p-methoxyphenyl)-4,5-diphenylimidazole dimer; benzophenone derivatives such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 4-chlorobenzophenone, 4,4'-dimethoxybenzophenone and 4,4'-diaminobenzophenone; α-aminoaromaticketone derivatives such as 2-benzyl-2-dimethylamino-1-(4-morpholinophenyl)-butanone-1,2-methyl-1-[4-(methylthio)phenyl]-2-morpholino-propan-1-one; quinones such as 2-ethylanthraquinone, phenanthrenequinone, 2-t-butylanthraquinone, octamethylanthraquinone, 1,2-benzoanthraquinone, 2,3-benzoanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone and 2,3-dimethylanthraquinone; benzoin ether derivatives such as benzoinmethyl ether, benzoinethyl ether and benzoinphenyl ether; benzoin derivatives such as benzoin, methylbenzoin, ethylbenzoin and propylbenzoin; benzyl derivatives such as benzyldimethylketal; acridine derivatives such as 9-phenylacridine and 1,7-bis(9,9'-acridinyl)heptane; N-phenylglycine derivatives such as N-phenylglycine; acetophenone derivatives such as acetophenone, 3-methylacetophenone, acetophenonebenzylketal, 1-hydroxycyclohexylphenylketone and 2,2-dimethoxy-2-phenylacetophenone; thioxanthone derivatives such as thioxanthone, diethylthioxanthone, 2-isopropylthioxanthone and 2-chlorothioxanthone; acylphosphineoxide derivatives such as 2,4,6-trimethylbenzoyldiphenylphosphineoxide, bis(2,4,6-trimethylbenzoyl)phenylphosphineoxide and bis(2,6-dimethoxybenzoyl)-2,4,4-trimethylpentylphosphineoxide; oxime ester derivatives such as 1,2-octanedione, 1-[4-(phenylthio)-, 2-(O-benzoyloxime)], ethanone, 1-[9-ethyl-6-(2-methylbenzoyl)-9H-carbazol-3-yl]- and 1-(O-acetyloxime); xanthone, fluorenone, benzaldehyde, fluorene, anthraquinone, triphenylamine, carbazole, 1-(4-isopropylphenyl)-2-hydroxy-2-methylpropan-1-one, 2-hydroxy-2-methyl-1-phenylpropan-1-one, and the like.

Examples of commercially available products of the above-mentioned radical generators include, but are not limited to, Irgacure 184, 369, 651, 500, 819, 907, 784, 2959, CGI-1700, -1750, -1850, CG24-61, Darocur 1173, Lucirin TPO, LR8893 and LR8970 (these are manufactured by BASF, "Darocur" and "Lucirin" are registered trademarks), Ebecryl P36 (manufactured by UCB) and the like.

The incorporation rate of the photopolymerization initiator (B) in the first liquid (O) is preferably 0.01% by mass or more and 15% by mass or less, more preferably 0.1% by mass or more and 10% by mass or less, when the total mass of the first liquid (O) is 100% by mass.

By setting the incorporation rate of the photopolymerization initiator (B) in the first liquid (O) to be 0.01% by mass or more with respect to the total mass of the first liquid (O), the curing rate of the ink 10 becomes fast, and the reaction efficiency can be enhanced. Furthermore, by setting the incorporation rate to be 15% by mass or less with respect to the total mass of the first liquid (O), the mechanical strength of the formed film 106 can be enhanced.

[Other Additional Components]

The first liquid (O) may contain further hydrophobic additional components within the scope in which the effect of the present disclosure is not deteriorated, depending on various purposes, besides the polymerizable compound (A) and the photopolymerization initiator (B) mentioned above. Examples of such additional components include, but are not limited to, antioxidants, polymer components, polymerization inhibitors and the like.

<Second Liquid (W)>

The second liquid (W) contained in the ink 10 is a liquid having hydrophilicity, and is a liquid incompatible with the first liquid (O). It is preferable that the second liquid (W) contains water (C). In other words, it is preferable that the second liquid (W) is an aqueous liquid. Furthermore, the second liquid (W) contains particles (D), which are second particles.

The second liquid (W) is dispersed in the first liquid (O) by forming droplets 101. When such ink 10 is cured, the volatile component in the second liquid (W) such as the water (C) is vaporized during and/or after the curing of the ink 10, and voids 105 are formed in the spaces in which the droplets 101 of the second liquid (W) were present. Furthermore, in this exemplary embodiment, since the second liquid (W) has particles (D), the particles (D) flocculate during the process of the above-mentioned vaporization, and thus flocculated forms 107 of the particles (D) are formed in the voids 105 in the film 106. By scattering incident light by the voids 105 and the flocculated forms 107 of the particles (D), the film 106 formed by the ink 10 looks whiter than a film in which only voids are present.

It is preferable that the ink 10 is an emulsion in which the droplets 101 formed by the second liquid (W) are stably dispersed in the first liquid (O). That is, it is preferable that the first liquid (O) and the second liquid (W) in the ink 10 form so-called a W/O type (water droplets-in-oil type) emulsion. It is preferable to form the ink 10 as such emulsion since the particle size (size) and dispersibility of the droplets 101 formed by the second liquid (W) can be stably kept. That is, it is preferable since the storage property of the ink 10 is improved.

In the present specification, that "the first liquid is dispersed in the second liquid by forming droplets" refers to that the first liquid forms a closed interface with the second liquid, and is present in the second liquid in the state of plurality of particles. In this definition, the size (diameter) of the particles is 1 nm or more, and these particles are referred to as "droplets". When the size of the particles is lower than 1 nm, the interface between the first liquid and the second liquid cannot be seen, and in such case, the first liquid and the second liquid are compatible and thus form a solution.

It is preferable that the first liquid (O) and the second liquid (W) are not separated into layers, and the droplets 101 formed by the second liquid (W) are dispersed in the first liquid (O), even if the ink 10 is left for a predetermined time or more under an atmosphere of 25° C. When a liquid containing the first liquid and the second liquid is stored in a predetermined container for a long time, two layers: a layer formed of the first liquid and a layer formed of the second liquid are generated in the container, and the layers are separated so that one layer is present on the other layer. In the present specification, separation into two layers in such way is referred to as "layer separation".

It is preferable that the ink 10 does not cause layer separation of the first liquid (O) and the second liquid (W) even if the ink 10 is mixed by stirring at a rotation number of 15,000 rpm or more for 3 minutes and then left for one hour under an atmosphere of 25° C. Furthermore, it is more preferable that the ink 10 does not cause layer separation even if left under the above-mentioned condition for 24 hours, and it is specifically preferable that the ink 10 does not cause layer separation even if left for one week.

When confirming that layer separation does not occur after mixing by stirring, it is preferable to confirm it by the following procedures. Firstly, an ink as an object is put into a bottle (20 mL), and mixed by stirring by using a homogenizer (AHG-160D, manufactured by As One Corporation) at a rotation number of 15,000 rpm or more for 3 minutes. At this time, it is preferable to use HT 1008 manufactured by As One Corporation as a shaft generator. Thereafter, the mixed ink is then transferred to a light shielding sample tube, allowed to stand still under an atmosphere at 25° C., and observed at predetermined time intervals.

As mentioned above, the ink 10 can form the porous film 106 by that the parts in which the volatile component was present become voids due to the volatilization of the volatile component such as the water (C) contained in the ink 10 during and/or after the curing of the ink 10. At that time, when many voids each having a diameter of 0.1 µm or more and 20 µm or less are present, incident light that has entered the film 106 can be efficiently scattered, and thus the film 106 having a high degree of whiteness can be realized. The voids in the film 106 are more preferably 0.1 µm or more and 1 µm or less, further preferably 0.2 µm or more and 0.5 µm or less. In the case when the diameter of the voids in the film 106 is greater than 20 µm, the shielding property of the film 106 is sometimes lowered.

Meanwhile, the size of the voids formed after the ink 10 is cured depends on the size of the droplets 101 in the ink 10, and it was clarified by the consideration by the inventors of the present application that these two sizes are approximately identical. Therefore, it is preferable that the median diameter d50 in volume of the droplets 101 of the second liquid (W) in the first liquid (O) is 0.1 µm or more and 20 µm or less. Furthermore, the median diameter d50 in volume of the droplets 101 of the second liquid (W) in the first liquid (O) is more preferably 0.1 µm or more and 1 µm or less, further preferably 0.2 µm or more and 0.5 µm or less. The median diameter d50 in volume can be calculated from, for example, a particle size distribution in volume obtained by measuring by a light-scattering particle size distribution measurement process.

Furthermore, as mentioned above, the ink 10 can form flocculated forms of the particles (D) in the void 105 formed in the film 106, by the flocculation of the particles (D) during the vaporization of the volatile component such as the water (C). At this time, the size of the formed flocculated forms of the particles (D) is preferably 0.001 µm or more and 1 µm or less, more preferably 0.01 µm or more and 0.5 µm or less. By setting the size of the flocculated forms of the particles (D) to be 0.001 µm or more and 1 µm or less, incident light can be efficiently scattered, and thus the degree of whiteness of the film 106 can be improved. The size of the formed flocculated forms of the particles (D) depends on the content of the particles (D) in the second liquid (W). The details will be mentioned below.

[Water (C)]

The incorporation rate of the water (C) in the ink 10 is preferably 5% by mass or more and 50% by mass or less, more preferably 10% by mass or more and 30% by mass or less when the total mass of the ink 10 is set to be 100% by mass.

By setting the incorporation rate of the water (C) in the ink 10 to be 5% by mass or more, the volume of the voids formed in the film 106 can be increased, and the degree of whiteness of the film 106 can be increased. In the case when the incorporation rate of the water (C) in the ink 10 is greater than 50% by mass, the shielding property of the film 106 is sometimes decreased, and the degree of whiteness is sometimes lowered.

[Particles (D)]

The particles (D), which are the second particles contained in the second liquid (W) in the ink 10 of this exemplary embodiment, are preferably high refractive index particles having a refractive index of 1.4 or more and 2.8 or less. As mentioned above, when the ink 10 is cured to form the film 106, many voids are formed in the film 106 by the vaporization of the volatile component in the second liquid (W). At this time, in this exemplary embodiment, since the second liquid (W) contains the particles (D), flocculated forms of the particles (D) are formed insides of the voids in the film 106. By forming the flocculated forms of the particles (D) insides of the voids in the film 106, a film having a higher degree of whiteness than that of a film in which only voids are present can be formed, and a white image having a higher degree of whiteness than that of conventional white images can be obtained.

The refractive index of the particles (D) is preferably 1.6 or more and 2.8 or less, more preferably 1.7 or more and 2.8 or less, further preferably 1.9 or more and 2.8 or less, and specifically preferably 2.0 or more and 2.8 or less. By using particles having a high refractive index as the particles (D), the difference between the refractive indices of the flocculated forms of the particles (D) formed insides of the voids of the film 106 and the voids (air; refractive index 1) can be increased. By this way, light can be efficiently scattered by the flocculated forms of the particles (D), and thus the degree of whiteness of the film 106 can be improved.

The material of the particles (D) is not specifically limited, and the particles (D) may be either inorganic particles or resin particles. Inorganic particles tend to have a higher refractive index than that of resin particles. Therefore, the particles (D) are preferably inorganic particles in view of improvement of the efficiency of the light scattering by the flocculated forms of the particles (D) formed insides of the voids in the film 106 obtained by curing the ink 10.

It is more preferable that the particles (D) are particles containing at least one selected from the group consisting of silicon dioxide, mica, aluminum oxide, boehmite, titanium oxide, barium titanate, zirconium oxide, zinc oxide, barium sulfate and niobium oxide. Since these materials have high refractive indices, the degree of whiteness of the formed film 106 can further be improved by using particles containing these materials as the particles (D). Among these, it is specifically preferable that the particles (D) are titanium oxide particles in view of its high refractive index and material cost.

It is preferable that the particles (D) are dispersed in the second liquid (W). Since the particles (D) are dispersed in the second liquid (W), the flocculation and settling of the particles (D) in an ink state (the state before formation of the film 106) can be suppressed. When the particles (D) are flocculated and settled, it is possible that the droplets 101 formed by the second liquid (W) are settled, or the droplets 101 are united. Therefore, by dispersing the particles (D) in the second liquid (W), the storage stability of the ink 10 can be improved.

It is preferable that the particles (D) are dispersed in the second liquid (W) by a resin or a surfactant as a dispersant. Alternatively, it is preferable that hydrophilic groups are introduced on the surfaces of the particles (D) by a surface treatment, and the particles (D) are dispersed in the second liquid (W) by the hydrophilic groups. Alternatively, it is preferable that at least a part of the surfaces of the particles (D) is coated with a compound containing at least one element selected from the group consisting of silicon, zirconium and aluminum, and the particles (D) are dispersed in the second liquid (W) by the coating. By having either of these forms, the particles (D) can be stably dispersed in the second liquid (W) for a long period, and thus the storage stability of the ink 10 can be improved.

As the dispersant for dispersing the particles (D) in the second liquid (W), conventionally known resins and surfactants that can be used for pigment ink compositions can be used without specific limitation. Since the second liquid (W) is an aqueous liquid containing the water (C) in this exemplary embodiment, it is preferable that the dispersant is a water-soluble resin. Furthermore, it is preferable that the dispersant is an anionic dispersant or a nonionic dispersant. Examples of the dispersants that are preferable for this exemplary embodiment include polyacrylic acid, styrene-acrylic acid copolymers and the like, which are anionic dispersants. Furthermore, examples of the dispersant include polyvinyl pyrrolidone, polypropylene glycol and the like, which are nonionic dispersants.

In this exemplary embodiment, it is preferable that the second liquid (W) contains the dispersant as mentioned above. Furthermore, it is preferable that the dispersant as mentioned above is adsorbed on or bonded to at least a part of the surfaces of the particles (D). Furthermore, it is preferable that at least a part of the surfaces of the particles (D) are coated with the dispersant as mentioned above.

The surface treatment for dispersing the particles (D) in the second liquid (W) includes a surface modification treatment with a silane coupling agent such as an alkoxysilane having a hydrophilic group such as an epoxy group or an amino group. As a result of the surface modification treatment with the silane coupling agent, hydrophilic groups such as epoxy groups or amino groups can be introduced on the surfaces of the particles (D).

Furthermore, the surface treatment for dispersing the particles (D) in the second liquid (W) also includes a surface treatment in which the particles (D) are heated together with a compound containing at least one element selected from the group consisting of silicon, zirconium and aluminum.

The median diameter d50 in volume of the particles (D) is preferably 5 nm or more and 500 nm or less, more preferably 5 nm or more and 300 nm or less, specifically preferably 50 nm or more and 300 nm or less. By setting the median diameter d50 in volume of the particles (D) to be 500 nm or less, the size of the droplets formed by the second liquid (W) in the ink 10 can be sufficiently decreased, and thus the degree of whiteness of the film 106 can be improved. Furthermore, by setting the median diameter d50 in volume of the particles (D) to be 5 nm or more, the size of the flocculated forms of the particles (D) formed in the voids formed in the film 106 can be made a sufficient size, and thus the degree of whiteness of the film 106 can be increased.

It is preferable that the particles (D) have an achromatic color. Since the particles (D) have an achromatic color, light in a specific wavelength region in the visible light region is not selectively absorbed or reflected, and thus the degree of whiteness of the film 106 can be increased.

The incorporation rate of the particles (D) is preferably 1% by mass or more and 20% by mass or less, more preferable, 5% by mass or more and 15% by mass or less when the total mass of the second liquid (W) is set as 100% by mass.

By setting the incorporation rate of the particles (D) in the second liquid (W) to be 1% by mass or more, the size of the flocculated forms of the particles (D) formed in the voids formed in the film 106 can be made a sufficient size, and thus the degree of whiteness of the film 106 can be increased. In the case when the incorporation rate of the particles (D) in the second liquid (W) is greater than 20% by mass, it is possible that the dispersion of the particles (D) becomes unstable, and thus the storage stability of the ink 10 is lowered.

In this exemplary embodiment, high refractive index particles having a refractive index of 1.4 or more and 2.8 or less are used as the particles (D), but the present disclosure is not limited by the particles. The particles (D) in another exemplary embodiment of the present disclosure are white pigment particles.

Furthermore, the particles (D) in another exemplary embodiment of the present disclosure are particles containing at least one selected from the group consisting of silicon dioxide, mica, aluminum oxide, boehmite, titanium oxide, barium titanate, zirconium oxide, zinc oxide, barium sulfate and niobium oxide. By either of these exemplary embodiments, a photocurable ink by which a white image having higher storage stability and higher degree of whiteness than those of conventional white images can be attained.

[Other Additional Components]

The second liquid (W) may contain further additional components besides the volatile component such as the water (C) and the particles (D) mentioned above, depending on various purposes, in the scope in which the effect of the present disclosure is not deteriorated. As the additional components used herein, components that are incompatible with the above-mentioned first liquid (O) are used. Examples of such additional components include, but are not limited to, hydrophilic antioxidants, hydrophilic organic solvents, hydrophilic specific gravity adjusting agents and the like. It is considered that, in the case when plural kinds of volatile components containing the water (C) are added to the second liquid (W), those volatile components are vaporized together when the film 106 is formed by the ink 10. Therefore, in this case, the voids 105 in the film 106 obtained by curing the ink 10 are formed by the vaporization of the volatile components containing the water (C) contained in the second liquid (W).

The specific gravity adjusting agent can suppress the floating (creaming) of the droplets of the second liquid (W) caused by a difference in the specific gravities of the first liquid (O) and the second liquid (W). Examples of such water-soluble specific gravity adjusting agent include, but are not limited to, water-soluble salts such as sodium chloride and potassium chloride, and the like. The incorporation rate of the salt as the specific gravity adjusting agent differs depending on the specific gravity of the first liquid (O), and is preferably 1% by mass or more and 5% by mass or less when the total mass of the second liquid (W) is set as 100% by mass.

<Other Additional Components>

The ink 10 may contain further additional components besides the first liquid (O) and the second liquid (W) mentioned above, depending on various purposes, in the scope in which the effect of the present disclosure is not deteriorated. Examples of such additional components include an emulsifier (E) and the like. As mentioned above, the ink 10 has a form such that the droplets 101 formed by the second liquid (W) are dispersed in the first liquid (O), and the emulsifier (E) has a function to stabilize the dispersion of these droplets 101. Examples of such emulsifier (E) include a surfactant (Ea), inorganic particles (Eb) and the like. As the emulsifier (E), either of the surfactant (Ea) and the inorganic particles (Eb) may be singly used, or these may be used in combination, or in combination with other emulsifier (E).

[Surfactant (Ea)]

It is preferable that the ink 10 contains the surfactant (Ea). By this way, the dispersion stability of the droplets 101 dispersed in the ink 10 can be improved, and the size of the droplets 101 can be controlled. That is, since the ink 10 contains the surfactant (Ea), the unification of the droplets 101 can be suppressed, and thus the droplets 101 can be kept at a desired size for a long period. By incorporating the surfactant (Ea), even if the ink 10 is left at an atmosphere of 25° C. for a predetermined time or more, layer separation does not occur between the first liquid (O) and the second liquid (W), and thus the droplets 101 formed by the second liquid (W) can be dispersed in the first liquid (O).

The surfactant (Ea) may be constituted by one kind of surfactant, or may be constituted by plural kinds of surfactants.

It is preferable that the surfactant (Ea) is a nonionic surfactant. Since the surfactant (Ea) is a nonionic surfactant, a W/O type emulsion in which droplets of the second liquid (W) are dispersed in the first liquid (O) is easily formed. Examples of the nonionic surfactant include hydrocarbon-based surfactants.

Examples of the hydrocarbon-based surfactant include polyoxyalkylene alkyl ethers in which an alkylene oxide having a carbon number of 2 to 4 is added to an alkyl alcohol having a carbon number of 1 to 50, and the like.

Examples of the polyoxyalkylene alkyl ethers include methyl alcohol ethylene oxide adduct, decyl alcohol ethylene oxide adduct, lauryl alcohol ethylene oxide adduct, cetyl alcohol ethylene oxide adduct, oleyl alcohol ethylene oxide adduct, stearyl alcohol ethylene oxide adduct, stearyl alcohol ethylene oxide/propylene oxide adduct and the like. The terminal group of the alkyl alcohol polyalkylene oxide adduct is not limited to a hydroxyl group, which can be simply produced by adding a polyalkylene oxide to an alkyl alcohol. This hydroxyl group may also be converted to other substituent such as a polar functional group such as a carboxyl group, an amino group, a pyridyl group, a thiol group or a silanol group, or a hydrophobic functional group such as an alkyl group or an alkoxy group.

As the polyoxyalkylene alkyl ether, a commercially available product may also be used. Examples of the commercially available product include, but are not limited to, NONION series manufactured by NOF Corporation ("NONION" is a registered trademark), BLAUNON series and FINESURF series manufactured by Aoki Oil Industrial Co., Ltd., Pluriol series manufactured by BASF ("Pluriol" is a registered trademark), EMULGEN series manufactured by Kao Corporation ("EMULGEN" is a registered trademark) and the like.

In the case when the ink 10 contains the surfactant (Ea), the content of the surfactant (Ea) is, for example, 0.001% by mass or more and 20% by mass or less with respect to the total amount of the ink 10. The content is more preferably 0.01% by mass or more and 10% by mass or less, further preferably 0.1% by mass or more and 10% by mass or less. By setting the content of the surfactant (Ea) to be within the above-mentioned range, the dispersion stability of the droplets 101 can be improved.

[Inorganic Particles (Eb)]

The ink 10 contains inorganic particles (Eb), which are first particles. The inorganic particles (Eb) can improve the dispersion stability of the droplets 101 dispersed in the ink 10, and control the size of the droplets 101. That is, since the ink 10 contains the inorganic particles (Eb), the unification of the droplets 101 can be suppressed, and thus the droplets 101 can be kept at a desired size for a long period. That is, even if the ink 10 is left under an atmosphere at 25° C. for a predetermined time or more, layer separation does not occur between the first liquid (O) and the second liquid (W), and thus the droplets 101 formed by the second liquid (W) can be dispersed in the first liquid (O).

The present inventors presume the mechanism by which the above-mentioned effect can be obtained by the ink 10 containing the inorganic particles (Eb) as follows. That is, the ink 10 contains plural inorganic particles (Eb), in which at least a part of the inorganic particles (Eb) are present by being adsorbed on an interface between the first liquid (O) and the second liquid (W). That is, the inorganic particles (Eb) are disposed on the interface between the first liquid (O) and the droplets 101. At this time, when one inorganic particle (Eb) is focused, at least a part of the inorganic particle (Eb) is present by sticking out from the interface between the first liquid (O) and the droplets 101 toward the side of the first liquid (O). That is, it can be said that the inorganic particle (Eb) is disposed on the interface between the first liquid (O) and the second liquid (W), but the inorganic particle (Eb) is substantially contained in the first liquid (O). The reason therefor can be considered that, since the interface is formed between the first liquid (O) and the second liquid (W), the inorganic particles (Eb) that were originally dispersed in the first liquid (O) are adsorbed on the above-mentioned interface and put into the above-mentioned state. Therefore, if two or more droplets 101 on which the inorganic particles (Eb) are adsorbed on the interface get close, the inorganic particles (Eb) adsorbed on the interface act sterically and repulsively, and thus the unification of the droplets 101 is suppressed. As a result, the state in which the second liquid (W) is stably dispersed in the first liquid (O) is formed.

Such inorganic particles (Eb) are not specifically limited as long as they are particles containing an inorganic material, and may appropriately have a surface-modified layer or an adsorbing layer formed of the organic material or inorganic material on the surfaces of the particles. The inorganic material contained in the inorganic particles (Eb) may be of one kind or plural kinds. Furthermore, plural kind of inorganic particles may also be used as the inorganic particles (Eb).

The kind of the inorganic material contained in the inorganic particles (Eb) is not specifically limited, and it is preferable to use at least one metal oxide selected from the group consisting of silicon dioxide, mica, aluminum oxide, boehmite, titanium oxide, barium titanate, zirconium oxide, zinc oxide and niobium oxide. Among these, in view of the dispersion stability of the droplets 101 and the material costs of the inorganic particles (Eb), it is preferable to use at least one selected from the group consisting of silicon dioxide, aluminum oxide and titanium oxide.

Furthermore, as the inorganic particles (Eb), inorganic particles having a high refractive index are preferably used. At this time, it is preferable that the refractive index of the inorganic particles (Eb) is 0.05 or more greater than the refractive index of a cured product obtained by curing the polymerizable compound (A).

By setting the refractive index of the inorganic particles (Eb) to be 0.05 or more greater than the refractive index of the cured product obtained by curing the polymerizable compound (A), the reflectance of light at an interface between the inorganic particles (Eb) and the cured product (polymer) obtained by curing the polymerizable compound (A) can be increased. As a result, the light that has entered the film 106 is diffusely reflected or dispersed also at the interface between the inorganic particles (Eb) and the cured product obtained by curing the polymerizable compound (A), and thus the degree of whiteness of the film 106 can further be improved. As a result, the degree of whiteness of a white image formed by using the ink 10 can further be improved.

The cured product obtained by curing the polymerizable compound (A) has a refractive index of approximately about 1.5. Therefore, the refractive index of the inorganic particles (Eb) is not specifically limited, but is preferably 1.7 or more and 2.8 or less.

As mentioned above, it is specifically preferable to use titanium oxide particles as the inorganic particles (Eb). By using the titanium oxide particles as the inorganic particles (Eb), the degree of whiteness of the film 106 can be improved while improving the dispersion stability of the droplets 101. Furthermore, the titanium oxide particles are advantageous also in view of costs. The refractive index of the titanium oxide differs depending on the crystal form thereof, and is 2.52 to 2.71.

It is preferable that the inorganic particles (Eb) contained in the ink 10 has a median diameter d50 in volume of 5 nm or more and 100 nm or less. By decreasing the size of the inorganic particles (Eb), the inorganic particles (Eb) are easily adsorbed on the interface between the droplets 101 dispersed in the ink 10 and the first liquid (O), and thus the dispersion stability of the droplets 101 is improved.

When the median diameter of the droplets 101 is set as R and the median diameter of the inorganic particles (Eb) is set as r, it is preferable that the ratio of these (R/r) is 5 or more and 400 or less. In the case when the ratio (R/r) is smaller than 5, the inorganic particles (Eb) are too large with respect to the droplets 101, and thus the inorganic particles (Eb) tend to be difficult to adsorb on the interface between the droplets 101 and the first liquid (O). Furthermore, in the case when the ratio (R/r) is greater than 400, the inorganic particles (Eb) are too small with respect to the droplets 101, and thus the amount of the inorganic particles (Eb) to be adsorbed on the interface between the droplets 101 and the first liquid (O) for stabilizing the dispersion of the droplets 101. In any way, when the ratio (R/r) is out of the above-mentioned range, it is not preferable since the dispersion stabilization effect by the inorganic particles (Eb) is decreased.

The coating rate of the droplets 101 when the inorganic particles (Eb) are adsorbed on the interface between the droplets 101 and the first liquid (O) is preferably 50% or more and 100% or less. The coating rate is more preferably 70% or more and 100% or less, further preferably 80% or more and 100% or less, specifically preferably 90% or more and 100% or less. By setting the coating rate of the inorganic particles (Eb) with respect to the droplets 101 to be 50% or more, even if the droplets 101 with which the inorganic particles (Eb) are coated are brought into contact, the unification of the droplets 101 can be suppressed by the steric repulsion of the inorganic particles (Eb). As a result, the dispersion stability of droplets 101 can be improved.

Furthermore, although the ink 10 contains a plural number of inorganic particles (Eb), it is not necessary that all of the particles are adsorbed on the interface between the droplets 101 and the first liquid (O). That is, a part of the plural inorganic particles (Eb) contained in the ink 10 may be dispersed in the first liquid (O). Accordingly, the inorganic particles (Eb), which are the first particles, are dispersed in the first liquid (O) in the case when they are not adsorbed on the above-mentioned interface, whereas the particles (D), which are the second particles, are present in the second liquid (W). That is, it can be said that the particles (D), which are the second particles, are particles having higher hydrophilicity than the inorganic particles (Eb), which are the first particles.

An mentioned above, the inorganic particles (Eb) contain an inorganic material having a large specific gravity such as a metal oxide, and thus tend to have a greater specific gravity than those of the first liquid (O) and the second liquid (W). According to the Stoke's law, which is a formula representing a sedimentation velocity (end velocity) when small particles settle out in a fluid, it is known that the sedimentation velocity of the particles dispersed in the fluid (the liquid component in the ink 10) can be decreased by decreasing the particle diameter of the particles. By using particles having a particle size of 100 nm or less as the inorganic particles (Eb), although the particle size differs depending on the viscosity of the liquid component in the ink 10, the sedimentation velocity can be extremely decreased. As a result, it becomes possible to keep the state in which the inorganic particles (Eb) are dispersed in the ink 10 for a long time, and thus sedimentation can be suppressed.

The content of the inorganic particles (Eb) in the ink 10 is preferably for example 0.1% by mass or more and 20% by mass or less with respect to the total amount of the ink 10. The content is more preferably 1.0% by mass or more and 15% by mass or less, further preferably 5.0% by mass or more and 10% by mass or less. By setting the content of the inorganic particles (Eb) to be within the above-mentioned range, the dispersion stability of the droplets 101 can be improved.

<Physical Properties of Photocurable Ink>

The viscosity of the ink 10 at 25° C. is 1 mPa·s or more and 75 mPa·s or less. Furthermore, the viscosity of the ink 10 is more preferably 1 mPa·s or more and 30 mPa·s or less. By setting the viscosity of the ink 10 to be 1 mPa·s or more and 75 mPa·s or less, the ejection stability when the ink 10 is ejected by an ink-jet process can be improved.

<Process for Preparing Photocurable Ink Composition>

The ink 10 has a form in which the second liquid (W) is dispersed with forming the droplets 101 in the first liquid (O). Therefore, it is preferable to prepare the ink 10 by the following preparation process.

Firstly, the polymerizable compound (A) and the photopolymerization initiator (B) are mixed. Additional components are added thereto as necessary, and the resultant product is mixed to prepare the first liquid (O). Furthermore, additional components are added to the water (C) and the particles (D) as necessary, and mixing is conducted to prepare the second liquid (W).

Secondly, the second liquid (W) is put into the prepared first liquid (O) while stirring the prepared first liquid (O), and stirring is further conducted. By this way, the droplets 101 of the second liquid (W) can be formed in the first liquid (O).

Examples of the means for stirring include a homogenizer, an ultrasonic dispersing machine, a stirring machine and the like. Among these, a homogenizer or an ultrasonic dispersing machine is preferably used from the viewpoint that the particle size of the droplets 101 formed by the second liquid (W) can be made minute. The particle size of the droplets 101 dispersed in the ink 10 differs depending on the composition of the ink 10 and can be controlled depending on the conditions of the stirring.

Furthermore, in the case when a surfactant (Ea) as the emulsifier (E) and the inorganic particles (Eb) are added to the ink 10, the first liquid (O) containing the polymerizable compound (A) and the photopolymerization initiator (B) is prepared, and then the surfactant (Ea) and the inorganic particles (Eb) are added to the first liquid (O). Thereafter, it is preferable to put the second liquid (W) into this liquid while stirring this liquid to thereby form the droplets 101 of the second liquid (W).

<Ink Container>

The ink 10 is contained in an ink container. In other words, the ink container according to this exemplary embodiment contains the ink 10. The ink container according to this exemplary embodiment will be explained below in detail.

The ink container according to this exemplary embodiment is an ink container in which a photocurable ink is contained. In the present specification, "container" is a concept that encompasses a container itself and a packaging, and contains a photocurable ink directly or indirectly. That is, the container is such that the container is filled with the photocurable ink or the container filled with at least the photocurable ink is tightly closed by the packaging. That is, it can be said that the ink container according to this exemplary embodiment contains the container, and said container contains the ink 10.

The ink container is used for storing and transporting the photocurable ink when the photocurable ink is used by the image forming apparatus, and the photocurable ink contains in the ink container is supplied to the image forming apparatus in use.

Examples of the embodiment of the ink container include, but are not limited to, an ink cartridge, a bag (pack), a bottle, a tank, a bottle and a can. Among these, an ink cartridge, a bag, a bottle and a tank are preferable from the viewpoint that they are generally used and the moisture permeability and oxygen permeability are easily controlled to desired values, and a bag is more preferable.

The embodiment of use of the ink container is not specifically limited, and for example, an embodiment (1) such as a cartridge in which an ink container, which is a separate body from the image forming apparatus, is attached to the image forming apparatus, and a photocurable ink is fed from the ink container to the image forming apparatus in the state that the ink container is attached. Another example is an embodiment (2) such as a bottle in which the ink composition is fed to an ink tank or the like of the image forming apparatus from an ink container, which is a separate body from the image forming apparatus. Another example is an embodiment (3) in which the ink container has been installed in advance as a part of the image forming apparatus. In the cases of the embodiments (1) and (3), an image can be formed by feeding the photocurable ink from the attached ink container or the installed ink container to a head of the image forming apparatus through a connection part such as an ink tube. Furthermore, in the embodiment (2), an image can be formed by transferring the photocurable ink from the ink container to an ink tank or the like of the image forming apparatus and feeding the photocurable ink to a head of the image forming apparatus through a connection part such as an ink tube.

Figure 2A:
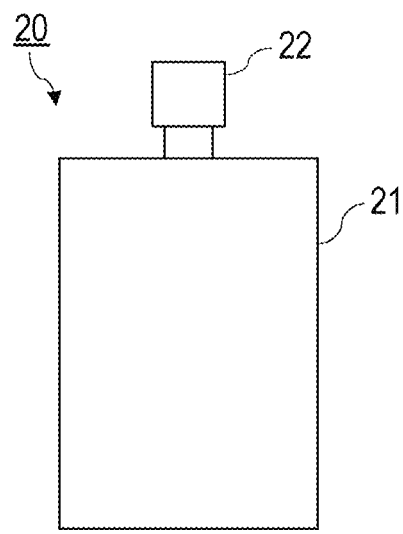
FIGS. 2A and 2B show a drawing showing an example of an ink container in which the photocurable ink according to this exemplary embodiment is contained.
Figure 2B:
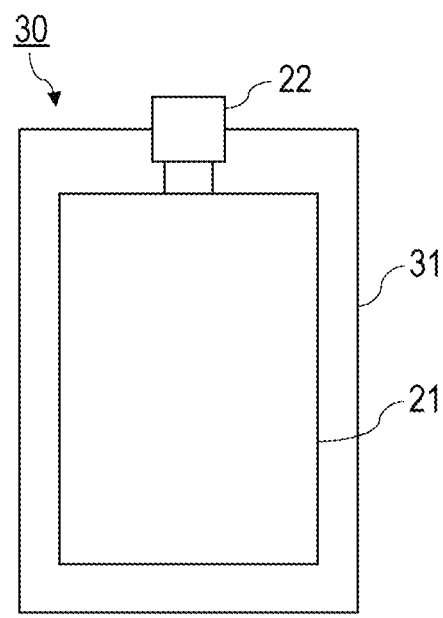

FIGS. 2A and 2B are drawings showing an example of the ink container according to this exemplary embodiment, and FIG. 2A represents the case when the ink container is an ink bag, and FIG. 2B represents the case when the ink container is an ink cartridge, respectively.

As shown in FIG. 2A, the ink bag 20 according to this exemplary embodiment has a bag 21 in which an ink 10 is contained, and an ink feeding port 22 that is in communication with the inside of the bag 21. The ink 10 contained in the ink bag 20 is fed to the image forming apparatus through the ink feeding port 22. In the state when the ink bag 20 is not attached to the image forming apparatus, it is preferable that the opening of the ink feeding port 22 is closed by a valve disposed inside.

The shape, size, structure, material and the like of the bag 21 are not specifically limited, and the bag is preferably formed by a film having a low air permeability. As the above-mentioned film, for example, resin films such as an aluminum laminate film, a polyamide film, a polyethylene telephthalate (PET) film, a polyethylene film, a polypropylene film, a polystyrene film, an ethylene vinyl acetate polymer film, an ethylene vinyl alcohol copolymer film and a polybutadiene film can be preferably used.

As shown in FIG. 2B, the ink cartridge 30 according to this exemplary embodiment has the above-mentioned ink bag 20, and a case 31 that is configured to house the ink bag 20 to protect the ink bag 20. Here, the ink feeding port 22 possessed by the ink bag 20 is exposed from a cut-out part disposed on the side part of the case 31 to the outside of the case 31. Furthermore, in the state that the ink cartridge 30 is attached to the cartridge holder of the image forming apparatus, the ink 10 is fed to the image forming apparatus through the ink feeding port 22. By constituting the ink feeding body as a constitution in which the ink feeding body is detachably attached to the image forming apparatus as an ink cartridge, the efficiency of operations such as suppliance and replacement of the photocurable ink can further be improved. The ink cartridge 30 may further have a recording head equipped with an ejection port that is in communication with the ink feeding port 22.

<Image Forming Method>

The image forming method according to this exemplary embodiment is a method for forming an image by disposing the ink 10 according to this exemplary embodiment explained above on a substrate. More specifically, the image forming method according to this exemplary embodiment includes a step of disposing an ink 10 on a substrate 102 as a recording medium (disposing step), and a step of irradiating the ink 10 disposed on the substrate 102 with light (light irradiation step). It is deemed that the "image" in the present specification includes a solid pattern in which the inside of a certain area is filled with a single color.

[1] Step of Disposing Ink 10 on Substrate 102 (Disposing Step)

In this step, the ink 10 is disposed on the substrate 102. Preferably, the ink 10 is ejected from the ink-jet recording head and disposed on the substrate 102. By disposing the ink by ejecting from the ink-jet recording head, the resolution of the formed image can be increased. The system for ejecting an ink by an ink-jet system is not specifically limited, but since the ink 10 contains the polymerizable compound (A), a process in which droplets are ejected by allowing kinetic energy to act on the ink (a piezo jet system) is preferable.

The kind of the substrate 102, which is a recording medium, is not specifically limited, and polymer materials such as paper, vinyl chloride and PET, metals, wood materials, fabrics, glass, ceramics, and the like can be used. The shape of the substrate is not specifically limited, and may be either a film or a plate, or may be another steric substance.

[2] Step of Irradiating Ink 10 Disposed on Substrate 102 with Light (Light Irradiation Step)

Figure 1B:
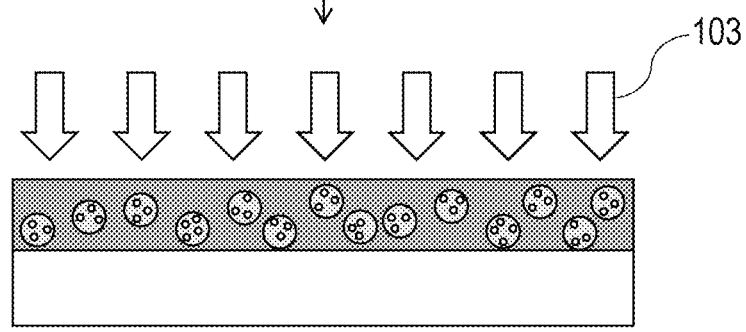
Figure 1C:
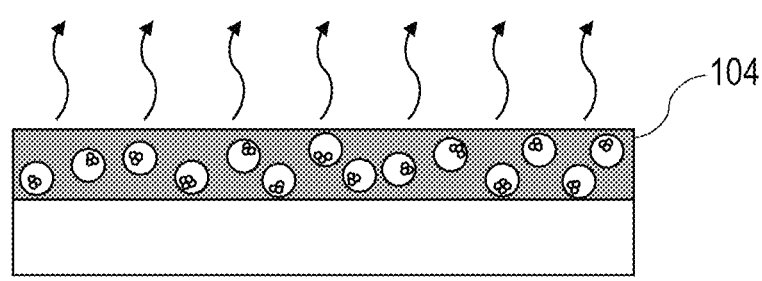
Figure 1D:
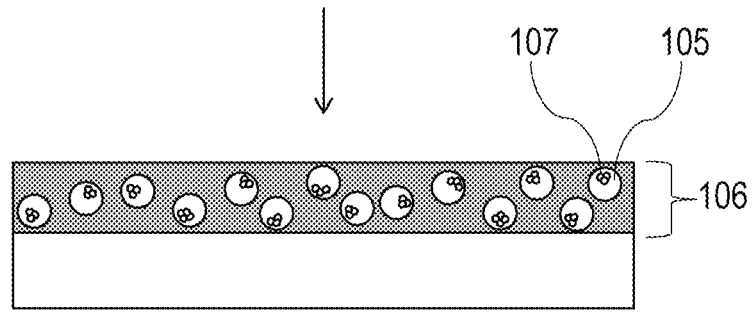

After disposing the ink 10 by allowing the ink 10 to land on the substrate 102 (FIG. 1A), as shown in FIG. 1B, the ink 10 is irradiated with light 103 such as ultraviolet light. By this way, the ink 10 is cured.

In this step, the kind of the irradiated light 103 is not specifically limited, and can be selected depending on the sensitivity and wavelength of the ink 10. Specifically, it is preferable to appropriately select and use ultraviolet light at a wavelength of 150 nm or more and 400 nm or less, X-ray, electron beam or the like.

Among these, ultraviolet light is specifically preferable as the light with which the ink 10 is irradiated. This is because many of commercially available photopolymerization initiators are compounds having sensitivity to ultraviolet light. Here, examples of light sources that emit ultraviolet light include a high pressure mercury lamp, an ultrahigh pressure mercury lamp, a low pressure mercury lamp, a Deep-UV lamp, a carbon arc lamp, a chemical lamp, a metal halide lamp, a xenon lamp, a light-emitting diode (LED) lamp, a KrF excimer laser, an ArF excimer laser, an $F_2$ excimer laser and the like, and an ultrahigh pressure mercury lamp or an LED lamp is specifically preferable. Furthermore, the number of the light sources may be either one or a plural number.

As mentioned above, according to this exemplary embodiment, the ink 10 has a form in which the second liquid (W) forms droplets in the ink 10, and said droplets are dispersed in the first liquid (O). When the ink 10 is irradiated with light, the first liquid (O) is cured to form a cured product 104.

At this time, the second liquid (W) is not cured, and the volatile component containing the water (C) in the second liquid (W) vaporizes during and/or after the curing of the first liquid (O). As a result, voids 105 having a size corresponding to the particle size of the droplets 101 are formed in the parts in which the droplets 101 formed by the second liquid (W) were present. Furthermore, when the volatile component containing the water (C) vaporizes, the particles (D) contained in the second liquid (W) flocculate. As a result, flocculated forms 107 of the particles (D) are formed in the voids 105.

During and/or after the above-mentioned light irradiation step, heating by a heater or the like, or a drying step by sending air may also be provided. By this way, the vaporization of the second liquid (W) is promoted, and the film 106 can be quickly dried.

EXAMPLES

The present disclosure will be explained below in detail by using Examples, but the technical scope of the present disclosure is not limited by the following Examples. The "part" and "%" in all occasions used in the following are based on masses unless otherwise specifically indicated.

<Preparation of Photocurable Ink>

The constitutional materials shown below were incorporated at a ratio shown in Table 1 and stirred, whereby the photocurable inks of Examples 1 to 4 and Comparative Examples 1 to 3 were respectively prepared. A first liquid (O) obtained by mixing the respective components at a ratio shown in Tables 1 and 2 was put into a bottle (20 mL), and stirred by a homogenizer (AHG-160D, manufactured by As One Corporation) equipped with a shaft generator (HT 1008, manufactured by As One Corporation). A second liquid (W) was then slowly added thereto, and the resultant product was stirred by mixing for 3 minutes. The rotation velocity of the homogenizer at that time was 15,000 rpm. The ratios shown in Tables 1 and 2 are based on % by mass.

[Constitutional Materials]

(Polymerizable Compound (A))

(A-1) Biscoat #230 (1,6-hexanediol diacrylate, manufactured by Osaka Organic Chemical Industry Ltd.)

(Photopolymerization Initiator (B))

(B-1) Lucirin TPO (2,4,6-trimethylbenzoyl-diphenyl-phosphineoxide, Manufactured by BASF)

(Water (C))

(C-1) Ion Exchanged Water (Particles (D))

(D-1) 5% by Mass TTO-W-5

TTO-W-5 (an aqueous dispersion containing titanium oxide particles at a content of 31% by mass, manufactured by Ishihara Sangyo Kaisha, Ltd.) was diluted with ion exchanged water so that the concentration of the titanium oxide particles became 5% by mass to thereby prepare 5% by mass TTO-W-5. TTO-W-5 is titanium oxide particles whose surfaces have been treated with silicon dioxide. Furthermore, the titanium oxide particles contained in TTO-W-5 had a median diameter d50 in volume of 50 nm.

(D-2) 5% by Mass STS-21

STS-21 (an aqueous dispersion containing titanium oxide particles at a content of 40% by mass, manufactured by Ishihara Sangyo Kaisha, Ltd.) was diluted with ion exchanged water so that the concentration of the titanium oxide particles became 5% by mass to thereby prepare 5% by mass STS-21. STS-21 is titanium oxide particles dispersed with ammonium polyacrylate. Furthermore, the titanium oxide particles contained in STS-21 had a median diameter d50 in volume of 20 nm.

(Emulsifier (E))

(Inorganic Particles (Eb))

(Eb-1) Acrylic Monomer Dispersion of Titanium Oxide Particles (MT-100HD)

Titanium oxide particles MT-100HD (manufactured by Tayca) were dispersed in Biscoat #230 (1,6-hexanediol diacrylate, manufactured by Osaka Organic Chemical Industry Ltd.) to give a dispersion.

The median diameter d50 in volume of the titanium oxide particles MT-100HD contained in this dispersion was measured by using a kinetic light-scatter type particle diameter distribution measurement apparatus (Nanotrack UPA-EX150, manufactured by Nikkiso Co., Ltd.) and was found to be 53 nm. Furthermore, the content of the titanium oxide particles MT-100HD contained in this dispersion was 28% by mass.

(Eb-2) NANOBYK-3605 (1,6-Hexanediol Diacrylate Dispersion of Silicon Dioxide Particles, Manufactured by BYK)

The median diameter d50 in volume of the silicon dioxide particles contained in NANOBYK-3605 was 25 nm. Furthermore, the content of silicon dioxide particles contained in NANOBYK-3605 was 50% by mass.

Preparation

Example 1

10.0 parts by mass of the photopolymerization initiator (B-1) was dissolved in 51.9 parts by mass of the polymerizable compound (A-1). 18.1 parts by mass of the dispersion (Eb-1) of the inorganic particles (Eb) was further added thereto, whereby a first liquid (O) was prepared. 20.0 parts by mass of the particles (D-1) were added as a second liquid (W) while the prepared first liquid (O) was stirred under the above-mentioned stirring conditions. Thereafter, the resultant product was further stirred to form a W/O emulsion in which droplets formed by the second liquid (W) were dispersed in the first liquid (O) was formed, whereby an ink 1 of Example 1 was prepared.

Example 2

An ink 2 of Example 2 was prepared by using the particles (D-2) instead of the particles (D-1) as the second liquid (W) in Example 1.

Example 3

An ink 3 of Example 3 was prepared by using 10.0 parts by mass of the dispersion (Eb-2) of the inorganic particles (Eb) instead of the dispersion (Eb-1) of the inorganic particles (Eb) in Example 1.

Example 4

An ink 4 of Example 4 was prepared by using the particles (D-2) instead of the particles (D-1) as the second liquid (W) in Example 3.

Comparative Example 1

An ink 5 of Comparative Example 1 was prepared by using ion exchanged water (C-1) instead of the particles (D-1) as the second liquid (W) in Example 1.

Comparative Example 2

An ink 6 of Comparative Example 2 was prepared by using ion exchanged water (C-1) instead of the particles (D-1) as the second liquid (W) in Example 3.

Comparative Example 3

3.0 parts by mass of the photopolymerization initiator (B-1) was dissolved in 56.0 parts by mass of the polymerizable compound (A-1) to prepare a first liquid (O). 41.0 parts of the water (C-1) was added to the resultant product while the prepared first liquid (O) was stirred under the above-mentioned stirring conditions. Thereafter, the resultant product was further stirred to form an ink 7 of Comparative Example 3.

TABLE 1

| | Constitutional Materials | | Example 1 | Example 2 | Comparative Example 1 | Comparative Example 3 |
|---|---|---|---|---|---|---|
| First liquid (O) | Polymerizable compound (A) | A-1 | 51.9 | 51.9 | 51.9 | 56.0 |
| | Photopolymerization initiator (B) | B-1 | 10.0 | 10.0 | 10.0 | 3.0 |
| | Inorganic particles (Eb) | Eb-1 | 18.1 | 18.1 | 18.1 | |
| | | Eb-2 | | | | |
| Second liquid (W) | Water (C) | C-1 | | | 20.0 | 41.0 |
| | Particles (D) | D-1 | 20.0 | | | |
| | | D-2 | | 20.0 | | |
| | Total | | 100.0 | 100.0 | 100.0 | 100.0 |

TABLE 2

| | Constitutional Materials | | Example 3 | Example 4 | Comparative Example 2 | Comparative Example 3 |
|---|---|---|---|---|---|---|
| First Liquid (O) | Polymerizable compound (A) | A-1 | 60.0 | 60.0 | 60.0 | 56.0 |
| | Photopolymerization initiator (B) | B-1 | 10.0 | 10.0 | 10.0 | 3.0 |
| | Inorganic particles (Eb) | Eb-1 | | | | |
| | | Eb-2 | 10.0 | 10.0 | 10.0 | |
| Second liquid (W) | Water (C) | C-1 | | | 20.0 | 41.0 |
| | Particles (D) | D-1 | 20.0 | | | |
| | | D-2 | | 20.0 | | |
| | Total | | 100.0 | 100.0 | 100.0 | 100.0 |

<Evaluation of Photocurable Inks>
[Formation of Films]

14 μL of the ink 1 of Example 1 prepared was added dropwise onto a slide glass (S1111 manufactured by Matsunami Glass Ind., Ltd.) by using a micropipette. Furthermore, the slide glass was covered with a PET film (Tetoron HL92W manufactured by DuPont Teijin Films) having a thickness of 100 μm, and a region of 26 mm×26 mm was filled with the ink 1.

Secondly, the slide glass was irradiated for 20 seconds through the PET film with light that had been emitted from a UV light source equipped with a ultrahigh pressure mercury lamp and passed through a diffusion plate. By this way, the ink 1 was cured. The irradiation light used was UV light having a wavelength of 365 nm and an illuminance of 15 mW/cm$^2$.

After the light irradiation, the PET film was peeled from the slide glass. Thereafter, the water contained in the cured film was vaporized by leaving the cured film at room temperature, whereby a film having a film thickness of approximately 20 μm was formed on the PET film.

For the respective inks of Examples 2 to 4 and Comparative Examples 1 and 2, films were respectively formed by similar procedures.

In the ink 7 of Comparative Example 3, at the time point after about 1 minute had passed after the preparation, droplets that had been enlarged by unification (presumed to be water droplets) started to be seen on the upper part of the liquid in the container, and the liquid had been completely separated into two layers at the time point when 10 minutes had passed. Accordingly, since the ink 7 of Comparative Example 3 had low storage stability, the formation and evaluation of a film were not conducted. It is considered that these layers after separation into two layers are respectively an oil layer formed of the first liquid (O) containing the polymerizable compound (A-1) and the photopolymerization initiator (B-1) and an aqueous layer formed of water (C). It is considered that, if a film is formed in the state of layer separation in such way, an approximately transparent film can be obtained.

[Evaluation of Degree of Whiteness of White Image]

The degree of whiteness of the white image obtained by the above-mentioned process was evaluated by measuring a brightness (L* value) and a shielding ratio (opacity). The brightness and shielding ratio were measured by using a spectrocolorimeter (CM-2600d manufactured by Konica Minolta Japan, Inc.) in an SCI system including regularly reflected light.

The results thereof are collectively shown in Table 3 or 4.

[Evaluation of Storage Stability]

The prepared inks were each put into a light shielding sample tube, and stored under a 25° C. environment for 1 week. The storage stability of each ink was evaluated by visually observing the ink from the viewpoints of settlability and dispersion stability.

The results thereof are collectively shown in Table 3 or 4. In addition, in the case when the presence of any precipitated product was observed when the sample tube after the storage was inclined, the settlability was evaluated as x (failed), whereas in the case when no precipitated product was observed, the settlability was evaluated as ○ (fine). Furthermore, in the case when separation into two or more layers (layer separation) of the ink in the sample tube after the storage was observed, the dispersion stability was evaluated as x (failed), whereas in the case when no separation was observed, the dispersion stability was evaluated as ○ (fine).

[Observation of Cross-sectional Surface of Film]

The cross-sectional surfaces of the white images obtained by Examples and Comparative Examples by the following process were observed.

The film with the white image formed thereon (ink layer) was frozen by immersing the film in liquid nitrogen for 10 minutes. Subsequently, an edge of a razor (FAS-10, manufactured by Feather Safety Razor Co., Ltd.) was applied to the upper surface of the frozen ink layer, and the razor was beaten with a hammer to cut the ink layer. Subsequently, the ink layer was fixed on a sample table for observation under a scanning electron microscope (SEM) with the cross-sectional surface facing upward.

The cross-sectional surface was observed by using an SEM (S-4800 (manufactured by Hitachi Ltd.)). The observation was conducted at a magnification of 3,000 to 70,000 times and an accelerated voltage of 5.0 kV. The observation was conducted by depositing Pt—Pd on the cross-sectional surface.

TABLE 3

| | Whiteness of film | | Storage stability | |
| --- | --- | --- | --- | --- |
| | Brightness (L*) | Shielding ratio (opacity, %) | Settlability | Dispersion stability |
| Example 1 | 73 | 57 | ○ | ○ |
| Example 2 | 75 | 61 | ○ | ○ |
| Comparative Example 1 | 71 | 53 | ○ | ○ |
| Comparative Example 3 | — | — | ○ | x |

TABLE 4

| | Whiteness of film | | Storage stability | |
| --- | --- | --- | --- | --- |
| | Brightness (L*) | Shielding ratio (opacity, %) | Settlability | Dispersion stability |
| Example 3 | 66 | 46 | ○ | ○ |
| Example 4 | 67 | 49 | ○ | ○ |
| Comparative Example 2 | 62 | 40 | ○ | ○ |
| Comparative Example 3 | — | — | ○ | x |

Firstly, the respective inks of Examples 1 to 2 and Comparative Example 1, which are inks using the titanium oxide particles (Eb-1), which are the organic particles (Eb), as the emulsifier (E), are considered. In the respective inks of Examples 1 to 2 and Comparative Example 1, it is considered that the titanium oxide particles (Eb-1) are present in the first liquid (O), and a part or entirety of the titanium oxide particles (Eb-1) is adsorbed on the interface between the first liquid (O) and the second liquid (W).

Either of the films formed by the respective inks of Examples 1 and 2, which are inks containing the particles (D) in the second liquid (W), had both higher brightness and higher shielding ratio than those of the film formed by the ink 5 of Comparative Example 1, which was free from the particles (D). Therefore, white images having a high degree of whiteness were able to be formed by incorporating the particles (D) in the second liquid (W).

Figure 3A:
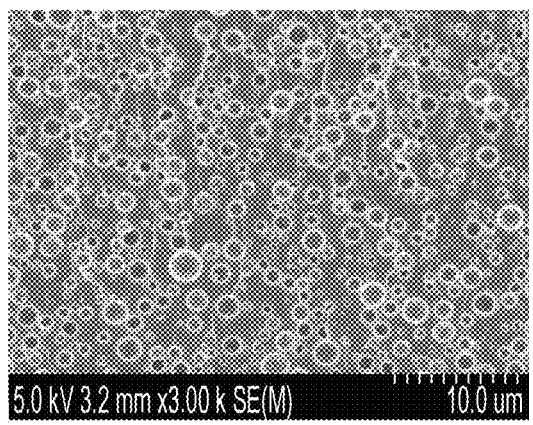
FIGS. 3A to 3F show cross-sectional SEM images of the films formed by the photocurable inks of Examples 1 and 2 and Comparative Example 1.
Figure 3B:
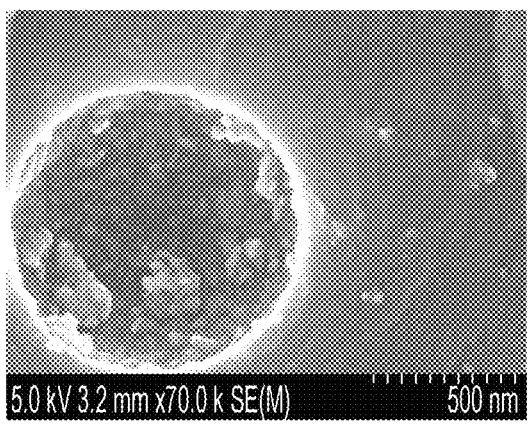
Figure 3C:
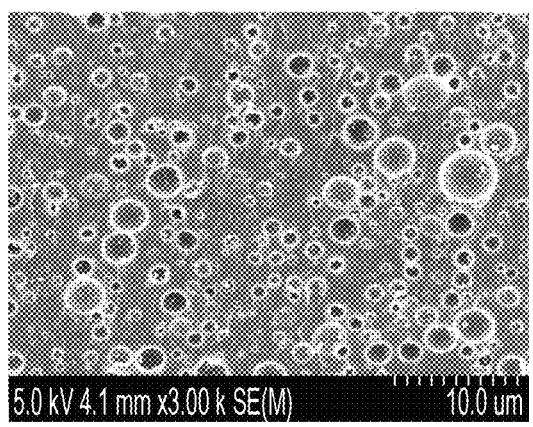
Figure 3D:
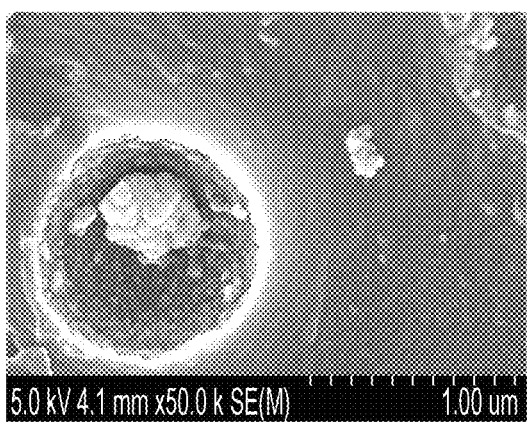
Figure 3E:
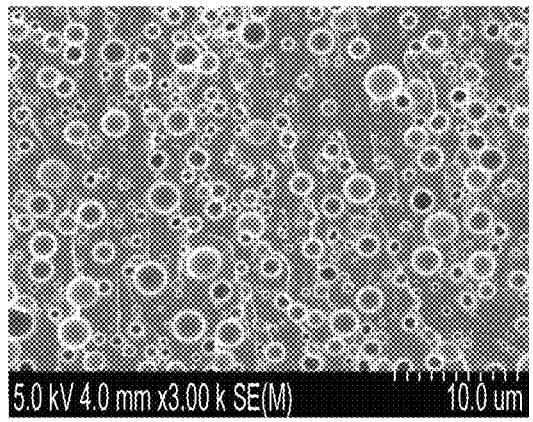
Figure 3F:
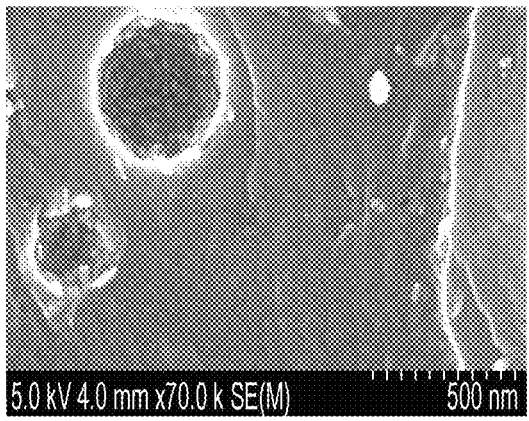

FIGS. 3A to 3F show the cross-sectional SEM images of the films formed by the respective inks of Examples 1 and 2 and Comparative Example 1. FIGS. 3A and 3B are the cross-sectional SEM images of the film formed by the ink 1 of Example 1. FIGS. 3C and 3D are the cross-sectional SEM images of the film formed by the ink 2 of Example 2. FIGS. 3E and 3F are the cross-sectional SEM images of the film formed by the ink 5 of Comparative Example 1. As shown in FIGS. 3A to 3F, when the cross-sectional surfaces of the respective films were observed, many voids each having a diameter of 0.1 μm or more and 5 μm or less were present in either film. It is considered that these films exhibit whiteness by the diffuse reflection of incident light by these many voids.

Furthermore, flocculated forms of the particles (D) were formed in the parts insides of the voids of the film formed by each of the inks of Examples 1 and 2, which are inks containing the particles (D) in the second liquid (W) (FIGS. 3A to 3D). Therefore, flocculated forms of the particles (D) were able to be formed insides of the voids in the formed films formed by incorporating the particles (D) in the second liquid (W). It is presumed that the degree of whiteness was further increased in Examples 1 and 2 by the diffuse reflection of incident light by these flocculated forms of the particles (D) besides the diffuse reflection of incident light by the voids.

Secondly, the respective inks of Examples 3 and 4 and Comparative Example 2, which are inks using the silicon dioxide particles (Eb-2), which are the inorganic particles (Eb), as the emulsifier (E), are considered. In the respective inks of Examples 1 to 2 and Comparative Example 1, it is considered that the titanium oxide particles (Eb-1) are present in the first liquid (O), and a part or entirety of the titanium oxide particles (Eb-1) are adsorbed on the interface between the first liquid (O) and the second liquid (W).

Either of the films formed by the respective inks of Examples 3 and 4, which are inks containing the particles (D) in the second liquid (W), had both higher brightness and higher shielding ratio than those of the film formed by the ink 6 of Comparative Example 2, which was free from the particles (D). Therefore, white images having a high degree of whiteness were able to be formed by incorporating the particles (D) in the second liquid (W).

Figure 4A:
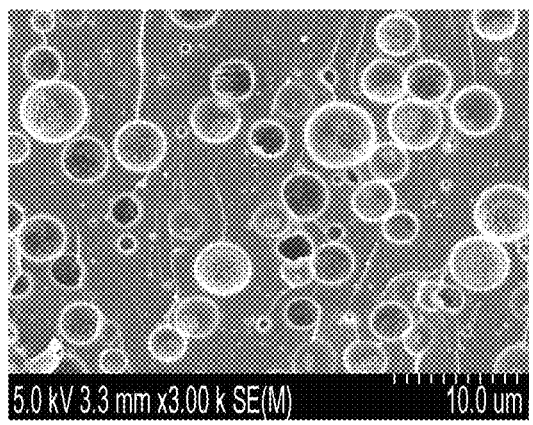
FIGS. 4A to 4F show cross-sectional SEM images of the films formed by the photocurable inks of Examples 3 and 4 and Comparative Example 2.
Figure 4B:
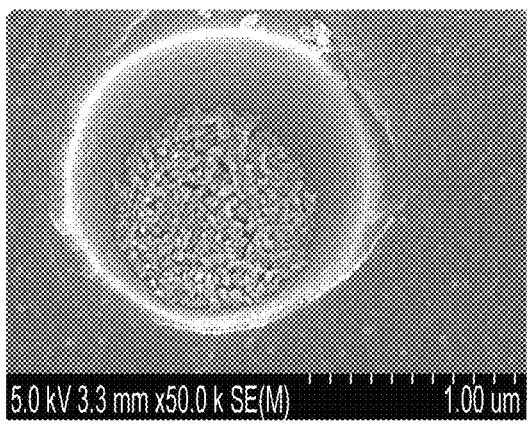
Figure 4C:
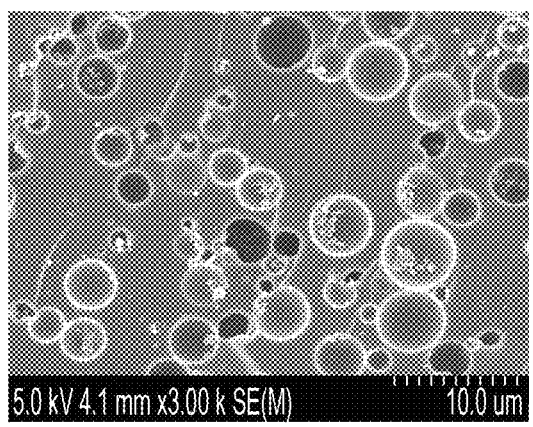
Figure 4D:
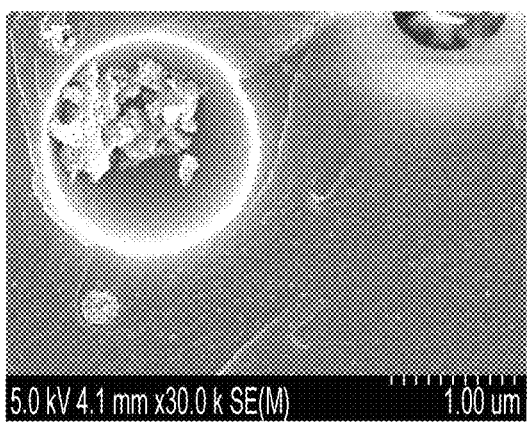
Figure 4E:
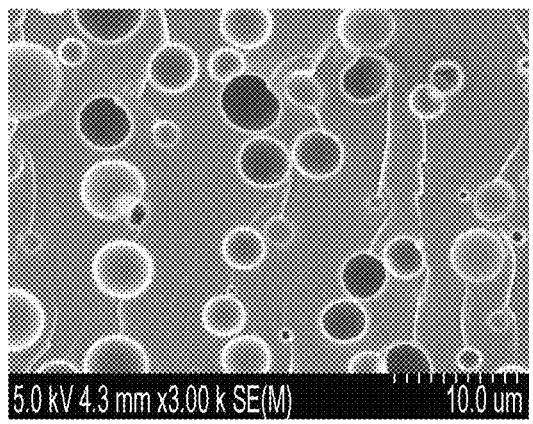
Figure 4F:
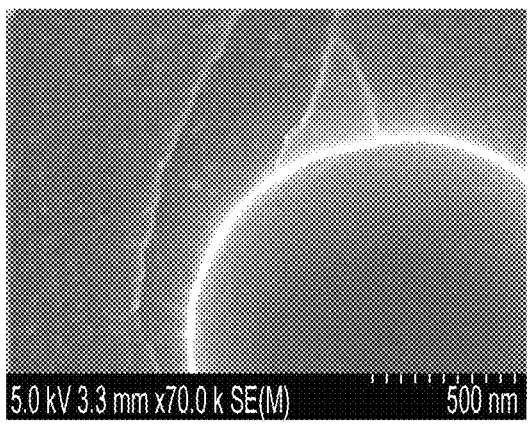

FIGS. 4A to 4F show the cross-sectional SEM images of the films formed by the respective inks of Examples 3 and 4 and Comparative Example 2. FIGS. 4A and 4B are the cross-sectional SEM images of the film formed by the ink 3 of Example 3. FIGS. 4C and 4D are the cross-sectional SEM images of the film formed by the ink 4 of Example 4. FIGS. 4E and 4F are the cross-sectional SEM images of the film formed by the ink 6 of Comparative Example 2. As shown in FIGS. 4A to 4F, when the cross-sectional surfaces of the respective films were observed, many voids each having a diameter of 0.1 μm or more and 10 μm or less were present in either of the films. It is considered that these films exhibit whiteness by the diffuse reflection of incident light by these many voids.

Furthermore, the flocculated forms of the particles (D) were formed in the parts insides of the voids of the films formed by the respective inks of Examples 3 and 4, which are inks containing the particles (D) in the second liquid (W) (FIGS. 4A to 4D). Therefore, flocculated forms of the particles (D) were able to be formed insides of the voids in the film by incorporating the particles (D) in void the second liquid (W). It is presumed that the degree of whiteness was further increased in Examples 3 and 4 by the diffuse reflection of incident light by the flocculated forms of the particles (D) besides the diffuse reflection of incident light by the voids.

Either of the respective inks of the respective Examples was an opaque white ink, and thus was considered to have formed an emulsion; and when the results of the observations of the cross-sectional surfaces of the formed films are considered, it is presumed that W/O type emulsions in which the second liquid (W) was dispersed in the first liquid (O) were formed. Furthermore, since it was found that the size of the voids in the film and the size of the droplets of the second liquid (W) in the ink were approximately identical, it is considered that the size of the droplets was 0.1 μm or more and 10 μm or less in either of these inks.

The ink 7 of Comparative Example 3 was an ink containing the second liquid (W), but as mentioned above, layer separation started at the time point when about 1 minute had passed after the completion of the preparation by stirring and mixing, and the layers were completely separated at the time point when 10 minutes had passed. In addition, it is considered that an approximately transparent film can be obtained in the case when a film is formed in a layer separation state, since it is considered that the film is formed in the state that the film is separated into two layers are separated also on the substrate.

On the other hand, either of the respective inks of Examples 1 to 4 was an ink containing the second liquid (W), but layer separation did not occur even after storage for 1 week after the completion of the preparation by stirring and mixing. Accordingly, it can be said that all of the respective inks of the respective Examples are photocurable inks having high storage stability and being capable of forming white images having high degree of whiteness.

Furthermore, it was able to be confirmed that many particles were present on the surfaces of the voids of the films formed by the respective inks of Examples 1 to 4. The reason is considered that the inorganic particles (Eb) are adsorbed on the interfaces of the droplets (water droplets) in each ink to thereby stabilize the emulsion. Furthermore, since plural inorganic particles (Eb) were arranged without gaps on the interfaces of the voids, it is considered that the coating rate of the droplets by the inorganic particles (Eb) is approximately 100%.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-217079, filed Nov. 7, 2016, and 2017-186693, filed Sep. 27, 2017, which are hereby incorporated by reference herein in their entirety.

What is claimed is:

1. A photocurable ink containing:
    a first liquid containing:
        a polymerizable compound; and
        a photopolymerization initiator, and
    a second liquid that is incompatible with the first liquid, in which droplets formed by the second liquid are dispersed in the first liquid,
    wherein the photocurable ink contains first particles and second particles having higher hydrophilicity than that of the first particles,
    wherein the first particles are adsorbed on an interface between the first liquid and the second liquid, and the second particles are present in the second liquid, and wherein the second particles have a refractive index of 1.4 or more and 2.8 or less.

2. The photocurable ink according to claim 1, wherein the second liquid contains water.

3. The photocurable ink according to claim 1, wherein the second particles have a median diameter in volume of 5 nm or more and 500 nm or less.

4. The photocurable ink according to claim 1, wherein the concentration of the second particles in the second liquid is 1% by mass or more and 20% by mass or less when the total mass of the second liquid is set as 100% by mass.

5. The photocurable ink according to claim 1, wherein the content of the second liquid is 5% by mass or more and 50% by mass or less when the total mass of the photocurable ink is set as 100% by mass.

6. The photocurable ink according to claim 1, wherein the droplets have a median diameter in volume of 0.1 μm or more and 20 μm or less.

7. The photocurable ink according to claim 1, wherein the second particles are inorganic particles.

8. The photocurable ink according to claim 1, wherein the second particles are titanium oxide particles.

9. The photocurable ink according to claim 1, wherein the polymerizable compound is a radical polymerizable compound.

10. The photocurable ink according to claim 1, wherein the first liquid further contains a surfactant.

11. The photocurable ink according to claim 1, wherein the first particles have a median diameter in volume of 5 nm or more and 100 nm or less.

12. The photocurable ink according to claim 1, wherein the second particles are dispersed in the second liquid by means of a dispersant.

13. The photocurable ink according to claim 1, wherein the second particles have hydrophilic groups on the surfaces thereof.

14. The photocurable ink according to claim 1, wherein at least a part of the surfaces of the second particles is coated with a compound containing at least one element selected from the group consisting of silicon, zirconium and aluminum.

15. The photocurable ink according to claim 1, which contains plural kinds of the first particles,
wherein a part of particles in the plural kinds of the first particles is adsorbed on the interface between the first liquid and the second liquid, and
another part of particles in the plural kinds of the first particles is present in the first liquid.

16. A photocurable ink containing:
a first liquid containing:
a polymerizable compound; and
a photopolymerization initiator, and
a second liquid that is incompatible with the first liquid, in which droplets formed by the second liquid are dispersed in the first liquid,
wherein the first liquid contains first particles, and the second liquid contains second particles,
wherein the second particles have a refractive index of 1.4 or more and 2.8 or less.

17. An ink container in which a photocurable ink is contained,
wherein the photocurable ink is a photocurable ink containing:
a first liquid containing:
a polymerizable compound; and
a photopolymerization initiator, and
a second liquid that is incompatible with the first liquid, in which droplets formed by the second liquid are dispersed in the first liquid,
wherein the photocurable ink contains first particles and second particles having higher hydrophilicity than that of the first particles,
wherein the first particles are adsorbed on an interface between the first liquid and the second liquid, and the second particles are present in the second liquid, and
wherein the second particles have a refractive index of 1.4 or more and 2.8 or less.

18. An image forming method, comprising:
a disposing step in which a photocurable ink is disposed on a substrate, and
a light irradiation step in which the photocurable ink disposed on the substrate is irradiated with light,
wherein the photocurable ink is a photocurable ink containing a first liquid containing a polymerizable compound and a photopolymerization initiator, and a second liquid that is incompatible with the first liquid, in which droplets formed by the second liquid are dispersed in the first liquid,
wherein the photocurable ink contains first particles and second particles having higher hydrophilicity than that of the first particles,
the first particles are adsorbed on an interface between the first liquid and the second liquid, and
the second particles have a refractive index of 1.4 or more and 2.8 or less and are present in the second liquid.

19. The image forming method according to claim 18, wherein the disposing step is a step in which the photocurable ink is disposed onto the substrate by ejecting the photocurable ink from an ink-jet recording head.

* * * * *